United States Patent [19]
Kovarik

[11] Patent Number: 5,575,585
[45] Date of Patent: Nov. 19, 1996

[54] MULTIPLE WELL CONTAMINANT RECOVERY APPARATUS

[75] Inventor: Jaromir Kovarik, Annville, Pa.

[73] Assignee: R. E. Wright Environmental, Inc., Middletown, Pa.

[21] Appl. No.: 389,329

[22] Filed: Feb. 16, 1995

[51] Int. Cl.⁶ .................................................. B09C 1/00
[52] U.S. Cl. ........................... 405/52; 210/747; 405/128; 166/50; 166/52
[58] Field of Search .................. 405/52, 128; 166/68.5, 166/105, 50, 52; 210/747, 901

[56] References Cited

U.S. PATENT DOCUMENTS

| | | | |
|---|---|---|---|
| 50,902 | 11/1865 | Casamajor | 166/50 |
| 50,903 | 11/1865 | Casamajor | 166/52 |
| 205,779 | 7/1878 | Worthen | 166/52 |
| 326,192 | 9/1885 | Baker | 166/50 |
| 551,646 | 12/1895 | Newsom | 166/52 |
| 1,241,003 | 9/1917 | Newsom | 166/52 |
| 4,020,901 | 5/1977 | Pisio et al. | 166/52 |
| 4,765,902 | 8/1988 | Ely et al. | 210/901 X |
| 5,419,655 | 5/1995 | Phillips et al. | 405/128 X |
| 5,449,249 | 9/1995 | Husten | 210/747 X |
| 5,474,685 | 12/1995 | Breslin | 210/747 X |

*Primary Examiner*—James A. Lisehora
*Attorney, Agent, or Firm*—Martin Fruitman

[57] ABSTRACT

The apparatus is a chamber within a ground excavation filled with porous material, with multiple angled well shafts projecting outward and down from the chamber. A pump located within the chamber pumps ground water from the several well shafts to a collector above ground, while a second pump in a sump adjacent to the chamber collects and removes contaminants which flow toward the sump because of the cone of depression formed by the several angled wells removing ground water. The angled well shafts located below the sealed chamber yield a much larger cone of depression than a single well, and use many fewer pumps than would multiple isolated vertical wells. Another advantage is that the system can operate without significant structures above ground, so that the apparatus is particularly well suited for decontaminating locations such as rail yards and other high traffic locations.

13 Claims, 3 Drawing Sheets

5,575,585

MULTIPLE WELL CONTAMINANT RECOVERY APPARATUS

BACKGROUND OF THE INVENTION

This invention deals generally with wells and more specifically with a multiple well shaft arrangement to remove and recover contaminants from a large area with a minimum number of pumps and without significant above ground structures.

An established method of removing contaminants from the ground is to pump water from the ground in the area of collection to create a "cone of depression". This technique actually lowers the ground water level in the local region where the pumped well removes water, and the dissolved as well as the lighter contaminants atop the ground water move down into the depression from which they can be pumped out of the ground. However, in order to decontaminate a large area, many individual wells are used and, since each of these wells uses a pump, and pipes are required to interconnect the many wells, pumps, and liquid storage facilities, the result is an elaborate network of above ground pipes for interconnection of the system. Such above ground structures can be used conveniently at locations where operations have been abandoned, but the use of such systems is very difficult in locations where there are still operating facilities. For instance, it is nearly impossible to continue normal operation of a railroad switch yard if pipes must criss-cross the area and pump houses and storage tanks occupy space required for the yard's operation.

SUMMARY OF THE INVENTION

The present invention, however, permits the decontamination of ground water over a large ground surface area with a very minimum number of structures above ground and with the capability of avoiding existing structures in any specific areas, such as the locations of roads, storage tanks, or railroad tracks.

This is accomplished by constructing an underground chamber from which several well shafts radiate outward and downward. These well shafts which angle out from the chamber are used to lower the water table of a large area which would otherwise require as many as six individual vertical wells. A single pump located either within the chamber or at a convenient above ground site can pump water from the multiple well shafts and to a water collection and treatment facility or back into the aquifer.

The underground chamber can have vapor and liquid sealed sides and bottom so that it can be located below the normal water table and within the contaminated region. The chamber can have a cover which can be constructed to be flat and support a significant load, so that transportation and industrial activities can take place above it. The cover can also be sealed so that, although it is at ground level, no precipitation, runoff, or surface contaminants enter the chamber.

The chamber is located within an excavation which is generously larger than the chamber itself, and the chamber is surrounded by a porous material, such as gravel, to form a drainage volume around the chamber. A contaminant recovery sump, including a contaminant recovery pump, a water level control pump, and liquid level controls, is located within the drainage volume and below the bottom level of the chamber. The recovery sump can be located either directly below the chamber, with an opening or hatch in the chamber bottom for service access to the sump, or, for easier access with less interaction between the chamber and the sump, the sump may be located adjacent to the chamber. When the chamber is located with its bottom below the normal water table, the chamber's exterior walls act, along with the gravel in the excavation, to accumulate and drain contaminants into the recovery sump.

One of the advantages of the invention is the ability to recover contaminants from under existing structures. Since the bottom ends of the angled wells pull water from a very wide area around the chamber, the depression in the water table caused by the multiple angled wells will effectively drain contaminants from under a building and into the accessible recovery sump located well clear of the building. This is further facilitated by the fact that the multiple water wells of the invention can use smaller diameter pipe than is conventionally used for single vertical wells. In many locations this permits the well points for the wells to be jetted or simply driven into the ground, eliminating the need for drilling.

The present invention is therefore able to accomplish decontamination not only with far fewer pumps, but also at sites, such as high traffic areas or locations below buildings, which are extremely difficult to treat by conventional means.

DETAILED DESCRIPTION OF THE INVENTION

Figure 1:
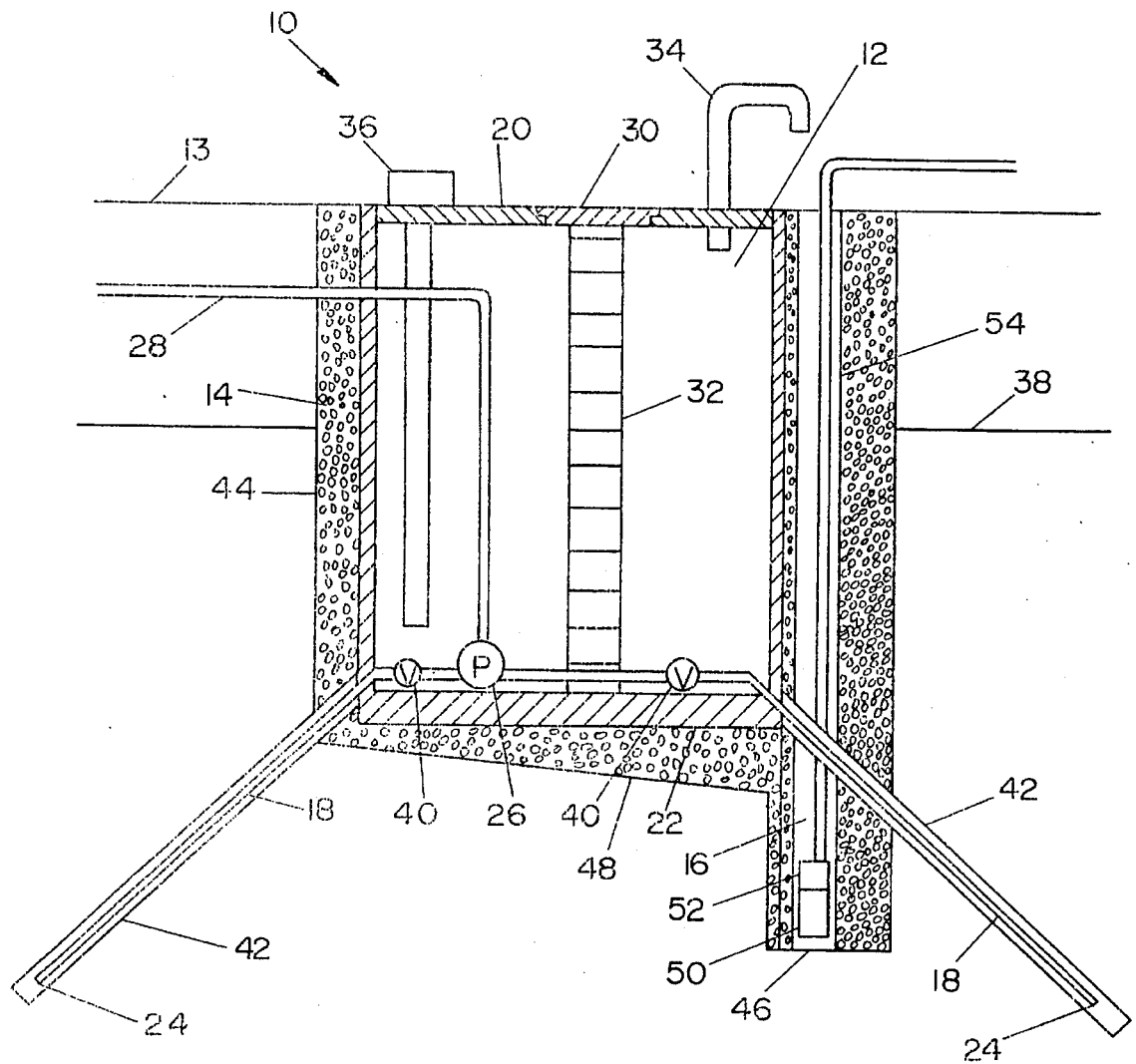
FIG. 1 is a simplified cross section elevation view of the preferred embodiment of the invention.

FIG. 1 is a simplified cross section elevation view of the preferred embodiment of the invention in which contaminant recovery apparatus 10, is constructed with sealed chamber 12 below ground surface 13 and surrounded by gravel bed 14, with recovery sump 16 adjacent to chamber 12. Several well pipes 18, penetrate through the walls of chamber 12 and are oriented to radiate outward from chamber 12, and well pipe bottoms 24 are located below bottom 22 of chamber 12.

Chamber 12 can be constructed in any configuration, such as cubical or as a rectangular prism, but perhaps the simplest shape to use is a cylinder. The cylindrical shape permits the use of a section of large prefabricated pipe with flat plates sealed to the ends of the pipe section to form the top 20 and bottom 22 of chamber 12. In the preferred embodiment chamber 12 is a concrete pipe section 9 feet in diameter and 16 feet high, although these dimensions are not critical, and has walls 12 inches thick, a top 12 inches thick, and a bottom 18 inches thick. Essentially, the size of chamber 12 is determined by the equipment, such as water pump 26 and pipes 28, which are located within it and the requirement for personnel access for servicing that equipment. To facilitate access and use by personnel, chamber 12 includes hatch 30, ladder 32, vent 34 and ventilator 36.

Figure 3:
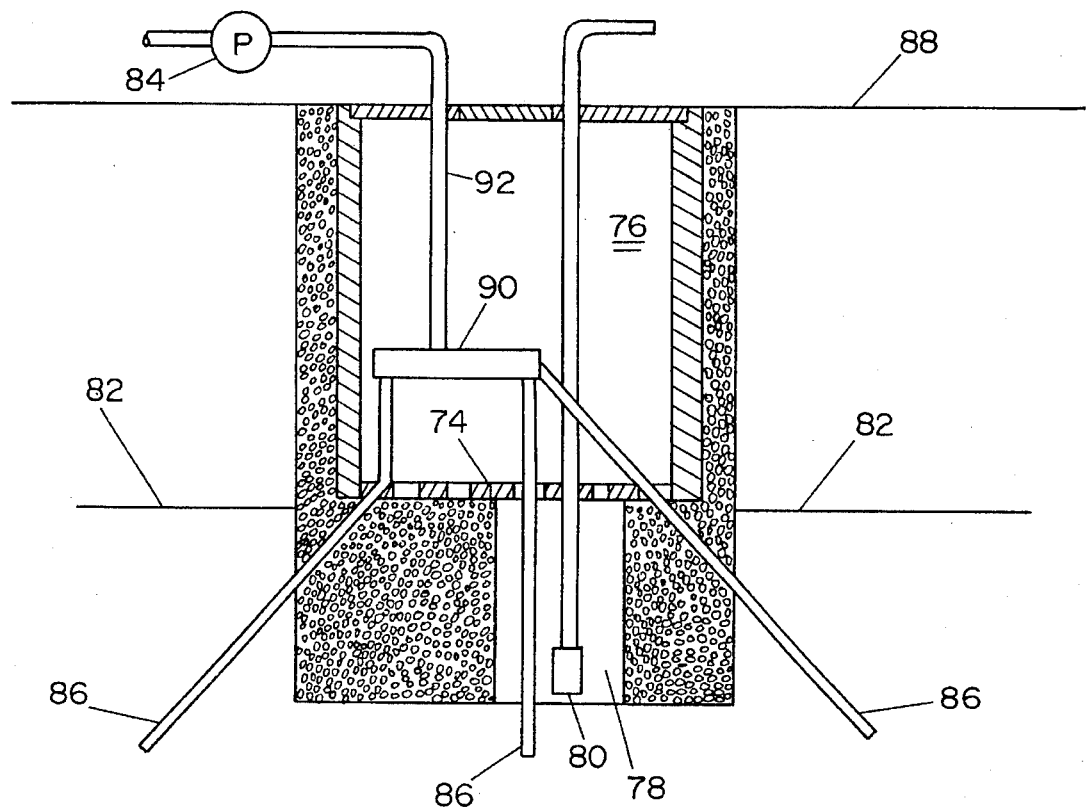
FIG. 3 is a simplified cross section elevation view of an alternate embodiment of the invention in which the bottom of the chamber is open to the contaminant recovery sump.

The essential function of water pump 26 is to pump ground water from well bottoms 24, through well pipes 18, through pipes 28 to a water storage or treatment facility (not shown) or to return the water back into the ground. Depending upon the type of pump used for pump 26 and its vertical lift capability, it may actually be necessary to include an intermediate water storage tank (not shown) within chamber 12 and a second pump (not shown) to pump water from the intermediate tank to the final storage or treatment facility. When it is convenient it is also possible to locate the pump above ground level, as shown in FIG. 3. The decision on the use and location of such equipment depends upon the distance of the original ground water table 38 below ground surface 13 and is well within the skill of those experienced in the art of ground water decontamination.

Well pipes 18 are oriented at an angle to the vertical in order to remove ground water from a region significantly larger than the diameter of chamber 12. The spread of well pipes 18 and the depth of well bottoms 24 below ground surface 13 cause a much larger diameter cone of depression than would be available from a single vertical well, regardless of how much ground water was pumped through such a single vertical well. The multiple angled well pipes 18 feeding a single pump 26 thereby affect a much larger area than a single vertical well. In fact, the preferred embodiment of the invention drains an area with one pump which would otherwise require as many as six vertical wells, each with a pump.

The flow through each well pipe 18 is controlled by valve 40 which is located between well pipe 18 and pump 26. Valves 40 permit adjustment of the water flow in each well pipe, and thereby permit the modification of the shape of the area drained by pump 26. Well pipes 18 can also be installed within screen pipe 42 to permit the adjustment, even after installation, of the length of well pipes 18 inserted into the ground. Such adjustment capability permits adjustment of the depth of the bottom of the cone of depression below ground surface 13 for changing conditions.

In the preferred embodiment, four well pipes 18 are used radiating out from chamber 12 at angles separated in the horizontal plane by 90 degrees, and well bottoms 24 are located 33 feet below ground surface 13 and on a circle with a radius of approximately 33 feet whose center is on the extended axis of cylindrical chamber 12. Such a geometry makes it practical for chamber 12 to be located well clear of any structure such as a building or a road. Such a structure can be as much as three times further from chamber 12 than the 33 feet of the well end radius, and contaminant recovery apparatus 10 of the invention will still drain contaminants from under the structure. The configuration of the separated multiple well pipe ends essentially yields a cone of depression which is the same as that of a well which is over 50 feet in diameter.

Gravel 14 and sump 16 are the actual apparatus for recovering contaminants when pump 26 lowers the ground water level in the vicinity of chamber 12. Chamber 12 is located in excavation 44 which is larger than the outside dimensions of chamber 12 so that gravel 14 fills the volume adjacent to the sides and under the bottom 22 of chamber 12. Sump 16 is located adjacent to and has a bottom 46 below chamber 12, so that contaminants will accumulate in sump 16 when the ground water level in the vicinity of chamber 12 has been lowered to a level between bottom 22 of chamber 12 and bottom 46 of sump 16. To aid in the accumulation of contaminants in sump 16 bottom 48 of excavation 44 can be sloped toward sump 16.

To aid in removal of contaminants flowing into sump 16, a conventional dual pump arrangement is used with suitable controls. Sump water pump 50 is used to adjust the level of water within sump 16, while contaminant recovery pump 52 is used to remove contaminants such as hydrocarbons floating atop the water in sump 16. Conventional controls (not shown) are used to coordinate water pump 26, sump water pump 50, and recovery pump 52. Well screen 54 is located alongside chamber 12 and defines the walls of sump 16 while it provides access to sump water pump 50 and recovery pump 52 for both the liquids flowing into sump 16 and for controls, operating power, and the pipes carrying water and contaminants to the surface for storage or disposal.

Figure 2:
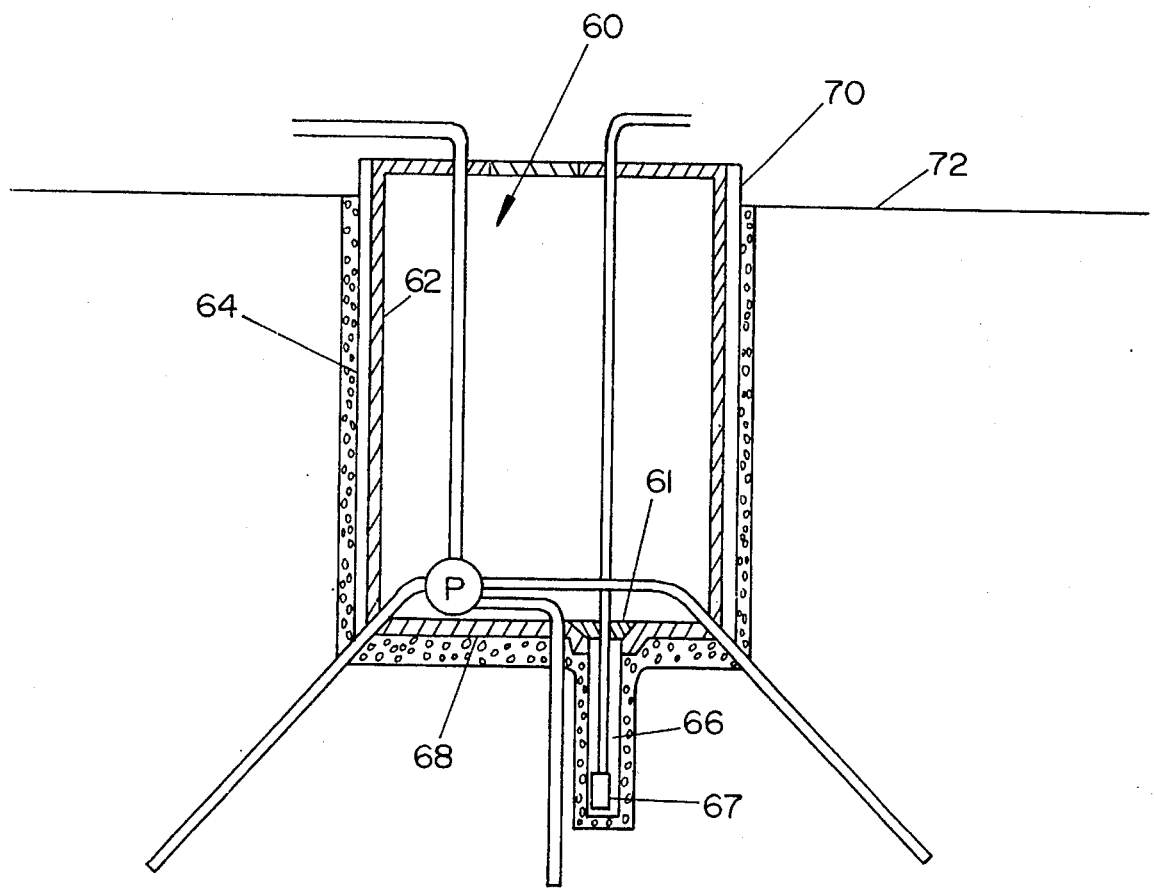
FIG. 2 is a simplified cross section elevation view of an alternate embodiment of the invention in which the contaminant recovery sump is located under a double walled pump chamber.

FIG. 2 is a simplified cross section elevation view of an alternate embodiment of the invention in which the contaminant recovery sump 66 is located under a double walled sealed pump chamber. In such an embodiment, chamber 60 is constructed as a double walled cylinder with inner wall 62 sealed and outer wall 64 being perforated. Thus, the large gravel bed surrounding chamber 12 in FIG. 1 is not required, since liquid can drain through perforated wall 64 and down to the outside of inner wall 62 toward the bottom of chamber 60. However, as shown in FIG. 2, it is frequently desirable to include some gravel around chamber 60 to prevent instability of the structure.

Another difference from chamber 12 of FIG. 1 is that FIG. 2 shows an alternate location for contaminant recovery sump 66 which includes dual pump 67. Sump 66 is located directly below bottom 68 of chamber 60 and is accessible from within chamber 60 through sealed cover 61. In a typical application, chamber 60 is constructed of steel, is 12.5 feet in diameter and 16.5 feet high.

FIG. 2 also demonstrates that the entire chamber need not be below ground surface, if, in a particular location, some portion of the chamber protruding above the ground surface would not interfere with existing operations. FIG. 2 shows top 70 of chamber 60 protruding slightly above ground surface 72, but such protrusion can be considerably greater when desirable.

FIG. 3 is a simplified cross section elevation view of an alternate embodiment of the invention in which bottom 74 of chamber 76 is open to contaminant recovery sump 78 which contains contaminant recovery pump 80. In such a structure, bottom 74 of chamber 76 can be a perforated plate or a grate located directly above recovery sump 78 in order to support personnel during service operations. The unsealed structure of chamber 76 shown in FIG. 3 is, of course, less expensive to construct than a sealed chamber, and is particularly appropriate for use when the chamber can be installed above the normal ground water level 82 in the region of the chamber. When normal ground water level 82, that is the ground water level without the system's water removal pump operating, is below the bottom of chamber 76, initial installation and later servicing of the apparatus can still be performed in a dry environment.

FIG. 3 also depicts an alternate location of water pump 84 above ground level. The location of pump 84 is typically dependent on the required depth of well bottoms 86 below ground surface 88 and the type of pump used, but, for service considerations, it is desirable to locate the pump above ground if it does not interfere with other activities. When pump 84 is located remote from the upper ends of the wells, it is also desirable to feed the wells into manifold 90 so that a single pipe 92 can feed pump 84.

The present invention therefore furnishes a contaminant recovery system which is particularly well suited for use in high traffic areas or areas already partly occupied by buildings, since virtually the entire apparatus can be installed below ground level, and yet it can be constructed to support both personnel and vehicles moving over it.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, the well pipes can be designed to be converted to steam or air injection or for vacuum extraction, and the length and inclination of the well pipes can be varied.

What is claimed as new and for which Letters Patent of the United States are desired to be secured is:

1. An apparatus for removing contaminants from ground water located below a ground surface comprising:

a chamber with walls, a top, and a bottom enclosing a volume, with at least part of the chamber located below the ground surface;

at least two well pipes extending downward and outward from the chamber so that the bottom ends of the well pipes are remote from the chamber and are located farther below the ground surface than the chamber bottom and are horizontally displaced from the chamber walls;

water pumping means connected to the well pipes and capable of moving water from the bottom ends of the well pipes to the ground surface;

a sump comprising a porous volume with side walls and a bottom boundary, the sump being located within the ground and in proximity to the chamber, and the bottom boundary of the sump being located more remote from the ground surface than the bottom of the chamber and so that the bottom boundary is located within the ground water at the location of the sump; and contaminant pumping means with an intake located within the sump and capable of pumping ground water contaminating fluids from the sump to the ground surface.

2. The apparatus of claim 1 wherein the part of the chamber below the ground surface is sealed so that neither liquids nor gases can enter the volume through the walls or the bottom.

3. The apparatus of claim 1 wherein the water pumping means comprises a water pumping means to pump water from the bottom ends of the wells to the chamber and access to the water from the water pumping means for moving water from the chamber to the ground surface.

4. The apparatus of claim 1 wherein the sump and the portions of the chamber within the ground are surrounded by porous material.

5. The apparatus of claim 1 wherein the sump is adjacent to the chamber.

6. The apparatus of claim 1 wherein the sump is located directly below the chamber.

7. The apparatus of claim 1 wherein a ventilating means is attached to and ventilates the enclosed volume of the chamber.

8. The apparatus of claim 1 wherein the top of the chamber is a structure which can support the weight of a vehicle.

9. The apparatus of claim 1 wherein the top of the chamber is sealed to prevent surface water from entering the chamber.

10. The apparatus of claim 1 wherein the top of the chamber includes a hatch for personnel access.

11. The apparatus of claim 1 wherein the sides of the chamber are constructed with an inner wall and an outer wall, the inner wall being sealed and the outer wall being perforated.

12. The apparatus of claim 1 wherein the water pumping means is located within the chamber.

13. The apparatus of claim 1 wherein the water pumping means is located within the chamber and the well pipes penetrate the chamber.

\* \* \* \* \*